DELAY LINE TIMING CIRCUIT FOR USE WITH COMPUTER OR OTHER TIMED OPERATION DEVICES

Filed Oct. 29, 1965

WITNESSES:

Bernard R. Giegue

James F. Young

INVENTOR
Earl T. Farley
BY E. F. Possessky
ATTORNEY

United States Patent Office 3,418,498
Patented Dec. 24, 1968

3,418,498

DELAY LINE TIMING CIRCUIT FOR USE WITH COMPUTER OR OTHER TIMED OPERATION DEVICES

Earl T. Farley, Monroeville, Pa., assignor to Westinghouse Electric Corporation, Pittsburgh, Pa., a corporation of Pennsylvania Filed Oct. 29, 1965, Ser. No. 505,690
7 Claims. (Cl. 307—293)

ABSTRACT OF THE DISCLOSURE

A flip-flop circuit initiates entry of a logic one signal to a tapped delay line. Feedback coupling from the delay line tap points clamps the flip-flop output at logic zero value after the leading edge of the delay line signal reaches the first delay line tap point. A delay line pulse of predetermined time span is thereby produced. The delay line output is coupled to the flip-flop set terminal to provide iterative delay line operation.

*Background of the invention*

The present invention relates to timing circuits and more particularly to delay line timing circuits which produce sequential signals for timing the operation of computers or other devices.

Computer control requires timing signals generally to define the time order in which information transfer and all other logic events occur. Other electronic and logic circuit devices have similar requirements.

To generate timing signals economically, a delay line can be connected in a suitable circuit for iterative operation. The delay line is provided with a predetermined electrical length and it can be tapped at predetermined points to provide the desired time spans between successive signals sensed at the tap and end points of the line. In high speed applications, a lumped parameter delay line is normally required because of the mechanical difficulty in accurately tapping a sonic delay line and because of the diseconomy associated with a lengthy distributed parameter line such as a coaxial cable.

*Summary of the invention*

It is essential that a tapped delay line operate with timing accuracy and without spurious signals conventionally caused by starting contact bounce electromagnetic coupling from ambient circuitry, and the like. In accordance with the principles of the present invention, an improved tapped delay line timing circuit comprises a tapped delay line to which there is connected an input circuit. Operation is initiated by the application of a start signal to the input circuit, and the delay line output is coupled to the input circuit to provide for iterative operation. To provide substantial prevention of spurious signals on the delay line and preferably to limit the number of pulses on the line at any one time to one, a feedback connection is provided preferably from each delay line tap point to the input circuit.

The first delay line tap point defines the duration of the delay line pulse, and the remaining tap points are preferably electrically spaced to clamp the input circuit in a disabled state after the starting pulse has been entered on the line. Amplification of each tap signal for feedback use and for external control use is produced by an improved amplifier circuit. If a spurious signal is generated, the input circuit is normally clamped in a disabled state by the feedback circuitry to prevent pulse recirculation at least until the spurious signal clears the line.

It is, therefore, an object of the invention to provide a novel tapped delay line timing circuit which operates with improved accuracy.

Another object of the invention is to provide a novel tapped delay line timing circuit which substantially prevents the occurrence of spurious timing signals.

A further object of the invention is to provide a novel tapped delay line timing circuit which quickly clears any spurious signals that may occur.

An additional object of the invention is to provide a novel tapped delay line timing circuit in which delay line pulse duration is subjected to self-control enabling substantial prevention of spurious signals notwithstanding variation in delay line characteristics as a result of variations in ambient temperature or the like.

It is another object of the invention to provide a novel tapped delay line timing circuit which operates with improved accuracy and with improved efficiency and economy in tap amplification.

These and other objects of the invention will become more apparent upon consideration of the following detailed description along with the attached drawing.

*Description of the preferred embodiment*

Figure 1:
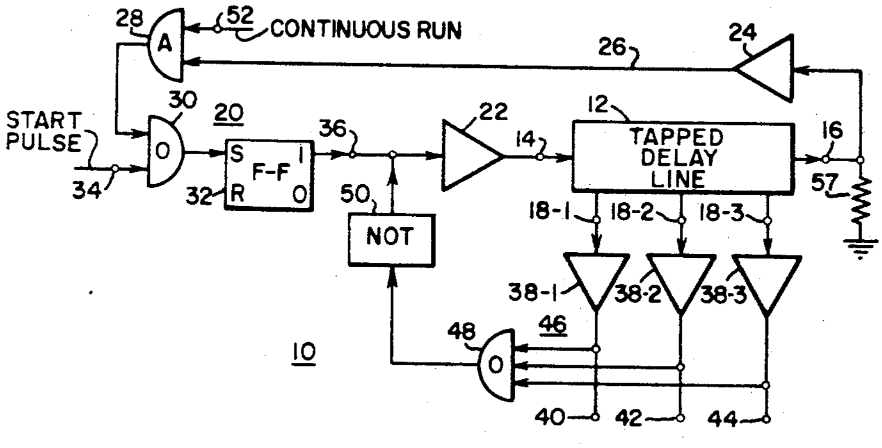
FIGURE 1 shows a schematic diagram of a tapped delay line timing circuit arranged in accordance with the principles of the invention.

More specifically, there is shown in FIG. 1 a tapped delay line timing circuit 10 which produces sequential timing signals for use in computers or other electronic devices. The circuit 10 includes a conventional tapped delay line 12 having input and output terminals 14 and 16 and intermediate tap terminals 18–1, 18–2 and 18–3. Fewer or more intermediate tap terminals than the number illustrated can be provided for the delay line 12 if desired. In this case, the tapped delay line 12 is a lumped parameter delay line formed with a predetermined number of LC sections in the conventional manner.

An input circuit 20 is provided for the delay line 12 and it includes an input pulse amplifier 22 of conventional design. Signals entered into the delay line 12 from the input amplifier 22 at the input terminal 14 are transported through the delay line 12 to the output terminal 16 where an output pulse amplifier 24 provides signal gain and transmits the signal through feedback path 26 to an AND circuit 28 for reapplication to the input circuit 20.

A conventional OR circuit 30 and a standard FLIP-FLOP circuit 32 are also included in the delay line input circuit 20. Delay line operation is initiated by application of a starting pulse from a source (not shown) at input terminal 34 of the OR circuit and the FLIP-FLOP 32 is then operated to its set state to produce a logic 1 output at terminal 36 for application to the delay line through the input amplifier 22. As the signal is conveyed through the delay line 12, signals appear successively at the tap terminals 18–1, 18–2 and 18–3 for amplification by respective tap amplifiers 38–1, 38–2 and 38–3. Sequential timing signals are thus made available at terminals 40, 42, 44 and the output terminal 16 for computer or other usage. After the start signal is released, the FLIP-FLOP 32 can be reset and the terminal 36 goes to logic 0. However, contact bounce or intentional reapplication of the start signal can reswitch the FLIP-FLOP 32 to its set state.

To prevent spurious delay line signals due to contact bounce in the starting pulse source or due to multiple application of the starting signal or inductive or capacitive coupling between the circuit 10 and ambient conductors, a feedback clamping circuit 46 is provided to clamp or disable the FLIP-FLOP output terminal 36 at logic 0 value under predetermined conditions. Thus, the electrical time delay between the delay line input terminal 14 and the first tap terminal 18–1 is preset by the relative location of the tap terminal 18–1 and it defines the time length of the entered delay line signal. As soon as the leading end of the signal reaches the tap terminal 18–1, a feedback signal is generated through the tap amplifier 38–1 and applied to a standard OR circuit 48 and inverted in a standard inverter or NOT circuit 50 to clamp the FLIP-FLOP output terminal 36 at logic 0 value by grounding or other means thereby normally resetting the FLIP-FLOP 32. The delay line input is then caused to drop instantaneously to zero to form a trailing edge for the delay line signal and complete the delay line pulse waveform.

The electrical time delay between successive tap terminals on the delay line 12 conforms substantially to the predetermined timing pattern for the output signal sequence and is preferably less than the predetermined delay line pulse time length so that the FLIP-FLOP 32 is clamped at logic 0 value output continuously irrespective of any spuriously generated FLIP-FLOP set pulses that may occur while the entered pulse progresses along the delay line 12 with tap point overlap characteristics. Generation of spurious pulses through the input amplifier 22 is thus substantially prevented.

Since the pulse length is defined by location of the first tap point, self-control is provided to maintain pulse overlap between successive tap points with delay line characteristic changes due to ambient temperature changes and the like. For example, a pulse having a decreased time length due to an ambient caused decrease in the delay between the delay line input and the first tap point, progresses along the delay line 12 with tap point overlap because the respective delays between successive tap points decrease correspondingly in response to the same ambient causal factor.

When the leading edge of the delay line pulse reaches the delay line output terminal 16, it is amplified by the output amplifier 24 and applied to the AND circuit 28. The AND output is applied to the input OR circuit 30 to set the FLIP-FLOP 32 if a continuous run signal is present at terminal 52 of the AND circuit 28. As soon as the trailing edge of the delay line pulse passes the last delay line tap terminal 18–3, the FLIP-FLOP output terminal 36 is released to a logic 1 value until the feedback amplifier 38–1 is activated to reset the FLIP-FLOP 32 and clamp the FLIP-FLOP output at logic 0. A new pulse is thus entered on the delay line 12. Continuation of the described process provides iterative timing operation for the circuit 10. If it is desired to interrupt or withold iterative operation of the circuit 10, the continuous run signal is removed from the AND circuit terminal 52.

If for some reason a spurious pulse is being carried by the delay line 12, delay line re-entry of an operating pulse is withheld after delay line readout since the FLIP-FLOP output terminal 36 is normally continuously clamped at logic 0 value by the feedback circuit 46 while a pulse is on the line 12. When the spurious pulse clears the line 12, the FLIP-FLOP output is quickly set to a logic 1 value and a new operating pulse is entered on the delay line 12 to provide for continued iterative operation.

Figure 2:
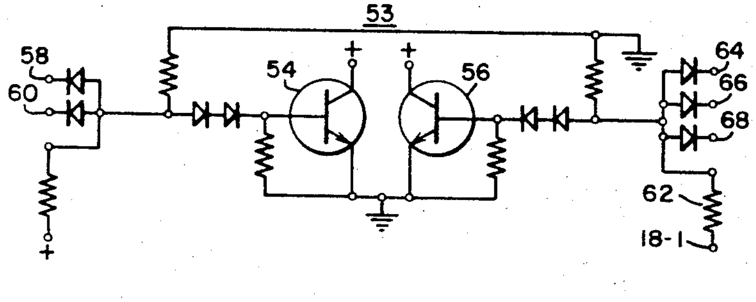
FIGS. 2–4 show various external connecting schemes for a delay line tap amplifier arranged in accordance with the principles of the invention.
Figure 3:
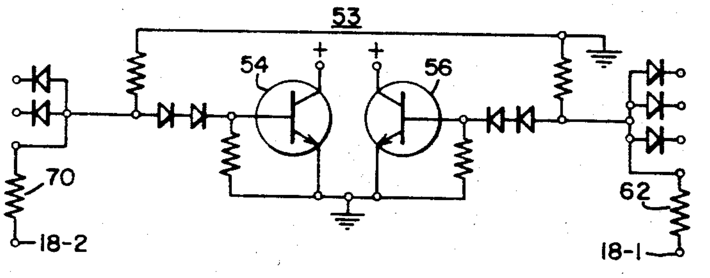
Figure 4:
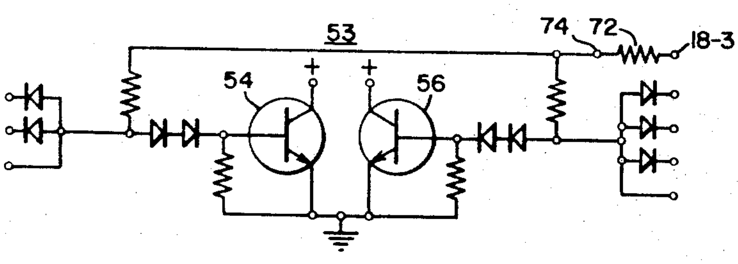

Although other threshold devices such as a conventional Schmitt trigger circuit can be employed, each tap amplifier 38–1, 38–2 or 38–3 preferably comprises a standard logic or standard NAND integrated or component circuit package unit 53 connected as shown in FIG. 2 or FIG. 3 or FIG. 4. The package comprises a pair of transistors 54 and 56 or integrated circuitry having portions equivalent to a pair of transistors. Each transistor 54 or 56 has an output collector terminal with load resistance being supplied by the OR circuit 48 or by other suitable means. In FIG. 2, the transistor 54 is connected as a NAND circuit with base drive provided by a low voltage source when greater than threshold input is applied to both of the logic input terminals 58 and 60 through respectively associated diode threshold paths. The transistor 56 is connected for tap signal amplification while producing only nominal delay line tap loading, namely one of the delay line tap terminals such as the terminal 18–1 is connected in the transistor base drive circuit to provide base drive through a resistor 62. To prevent substantial delay line power drain at the tap points, the delay line impedance can be substantially less than the tap amplifier input impedance. If the logic circuit unit 53 is an integrated circuit, the resistor 62 can be an external resistor. Logic input terminals 64, 66 and 68 can be placed in nonuse or they can be used to provide NAND logic control of application of base drive to the transistor 56 from the delay line tap 18–1.

In FIG. 3, the transistors 54 and 56 are employed as separate delay line tap amplifiers. Thus, the delay line tap terminal 18–1 is connected through the resistor 62 to provide base drive for the transistor 56 and the tap terminal 18–2 is connected through resistor 70 to provide base drive for the transistor 54.

In FIG. 4, the transistors 54 and 56 operate as separate amplifiers to produce multiple amplified outputs for a common tap terminal such as terminal 18–3. A single resistor 72 is connected between the tap terminal 18–3 and a terminal 74 to provide base drive for both transistors 54 and 56. A resistor 57 is connected to the delay line output terminal 16 to prevent delay line reflections.

With use of the tapped delay line timing circuit 10, improved timing accuracy is achieved substantially without spurious delay line pulses. Improved manufacturing economy is also realized particularly through the employment of standard mass use logic packages as tap amplifiers which only lightly load the delay line while generating signals for feedback accuracy control and for external timing use. An added advantage of the NAND tap amplifier is that output circuit operating time is made faster and fewer parts are used as compared to conventional tap amplifiers and associated output logic circuitry.

The foregoing description has been presented only to illustrate the principles of the invention. Accordingly, it is desired that the invention be not limited by the embodiment described, but, rather, that it be accorded an interpretation consistent with the scope and spirit of its broad principles.

What is claimed is:

1. A tapped delay line timing circuit comprising a delay line having input and output terminals and a plurality of tap terminals disposed at predetermined intermediate line locations, an input circuit having an output operable to apply a logic one value signal to the delay line input terminal, and means coupled to one of the delay line tap terminals for clamping the output of said input circuit at logic zero value after the input circuit output has been operated to apply a logic one value signal to the delay line input terminal and the signal has traveled to said one tap terminal thereby producing a delay line pulse with predetermined time span.

2. A tapped delay line timing circuit as set forth in claim 1 wherein means are provided for coupling the delay line output terminal to said input circuit to operate the input circuit output to a logic one value periodically and thereby iteratively operate the timing circuit, all of said tap terminals are connected to said clamping means to provide respective clamping actions against the input circuit output, and successive electrical spacings are provided between said tap terminals and between the last tap terminal and said output terminal so that iterative re-entry of a delay line pulse is normally withheld until any spurious pulses are cleared from said delay line.

3. A tapped delay line timing circuit as set forth in claim 1 wherein all of said tap terminals are coupled to said clamping means to provide respective clamping actions against the input circuit output, and successive electrical spacings are provided between said tap terminals and between the last tap terminal and said output terminal to sequence the respective clamping actions such that a continuous zero clamping action is placed on the input circuit output after the leading delay line pulse edge passes the first tap terminal until the trailing delay line pulse edge passes the last tap terminal.

4. A tapped delay line timing circuit as set forth in claim 1 wherein said clamping means includes a tap amplifier comprising a solid state NAND logic circuit, said logic circuit having at least one solid state switching element and a switch drive circuit having at least one diode logic threshold input path connected thereto, and a resistor connected in the switching element drive circuit to the first delay line tap point.

5. A tapped delay line timing circuit as set forth in claim 3 wherein said clamping means includes a clamping logic circuit, respective tap amplifiers coupling said delay line tap terminals with said clamping logic circuit, each of said tap amplifiers formed from a solid state NAND logic circuit, each of said NAND logic circuits having at least one solid state switching element and a switch drive circuit having at least one diode logic threshold input path connected thereto, and a resistor connected in each switching element drive circuit to the associated delay line tap terminal.

6. A tapped delay line timing circuit as set forth in claim 1 wherein said input circuit includes an input amplifier and a FLIP-FLOP circuit coupled to an input of said amplifier, said clamping means coupled to a logic one value output terminal of said FLIP-FLOP circuit to provide the logic zero clamping action.

7. A tapped delay line timing circuit as set forth in claim 3 wherein said input circuit includes an input amplifier and a FLIP-FLOP circuit coupled to an input of said amplifier, said clamping means including an OR circuit to which the delay line tap terminals are respectively coupled, a NOT circuit coupled to the output of said OR circuit, the output of said NOT circuit coupled to a logic one value output terminal of said FLIP-FLOP circuit to provide the zero clamping action.

References Cited

FOREIGN PATENTS 609,125 11/1960 Canada.

ARTHUR GAUSS, *Primary Examiner.*

STANLEY D. MILLER, *Assistant Examiner.*

U.S. Cl. X.R.

307—208, 215, 213, 237, 265; 328—56